United States Patent [19]

Nishihara

[11] Patent Number: 4,652,765
[45] Date of Patent: Mar. 24, 1987

[54] EDGE DETECTING DEVICE IN OPTICAL MEASURING INSTRUMENT

[75] Inventor: Sadamitsu Nishihara, Hino, Japan
[73] Assignee: Mitutoyo Mfg. Co., Ltd., Tokyo, Japan
[21] Appl. No.: 802,050
[22] Filed: Nov. 25, 1985
[30] Foreign Application Priority Data
Nov. 26, 1984 [JP] Japan .............................. 59-249278
[51] Int. Cl.$^4$ ........................................... G01N 21/30
[52] U.S. Cl. ..................................... 250/560; 356/384
[58] Field of Search ........................ 250/559, 560, 561; 356/383, 384, 387

[56] References Cited

U.S. PATENT DOCUMENTS 4,557,602 12/1985 Ueda .................... 356/372

Primary Examiner—Eugene R. LaRoche
Assistant Examiner—David Mis
Attorney, Agent, or Firm—Parkhurst & Oliff

[57] ABSTRACT

An edge detecting device in an optical measuring instrument for detecting a transmission or a reflected light to directly or indirectly measure a dimension of an object to be measured, the detecting device comprises: a sensor including two light receiving elements disposed on a moving plane of a relative movement between the object to be measured and the two light receiving elements so as to produce phase shift signals in response to a bright or a dark portion during the relative movement; a difference calculator connected to sensor output terminals in the sensor, for calculating a difference between the phase shift signals; a region signal generator for comparing a differential output signal of the difference calculator with reference signals of high level and low level, producing hold signals when the differential output signal is present between the high level and the low level, holding one sensor signal out of the sensor output signals, and outputting a signal in a specific region including a cross point between a reference level signal and the phase shift signals when the output signal is present between the high hold signal and the low hold signal thus held; and detector for outputting a cross signal between the differential output signal from the difference calculator and a preset reference level signal while the region signal generator outputs the signal.

24 Claims, 4 Drawing Figures

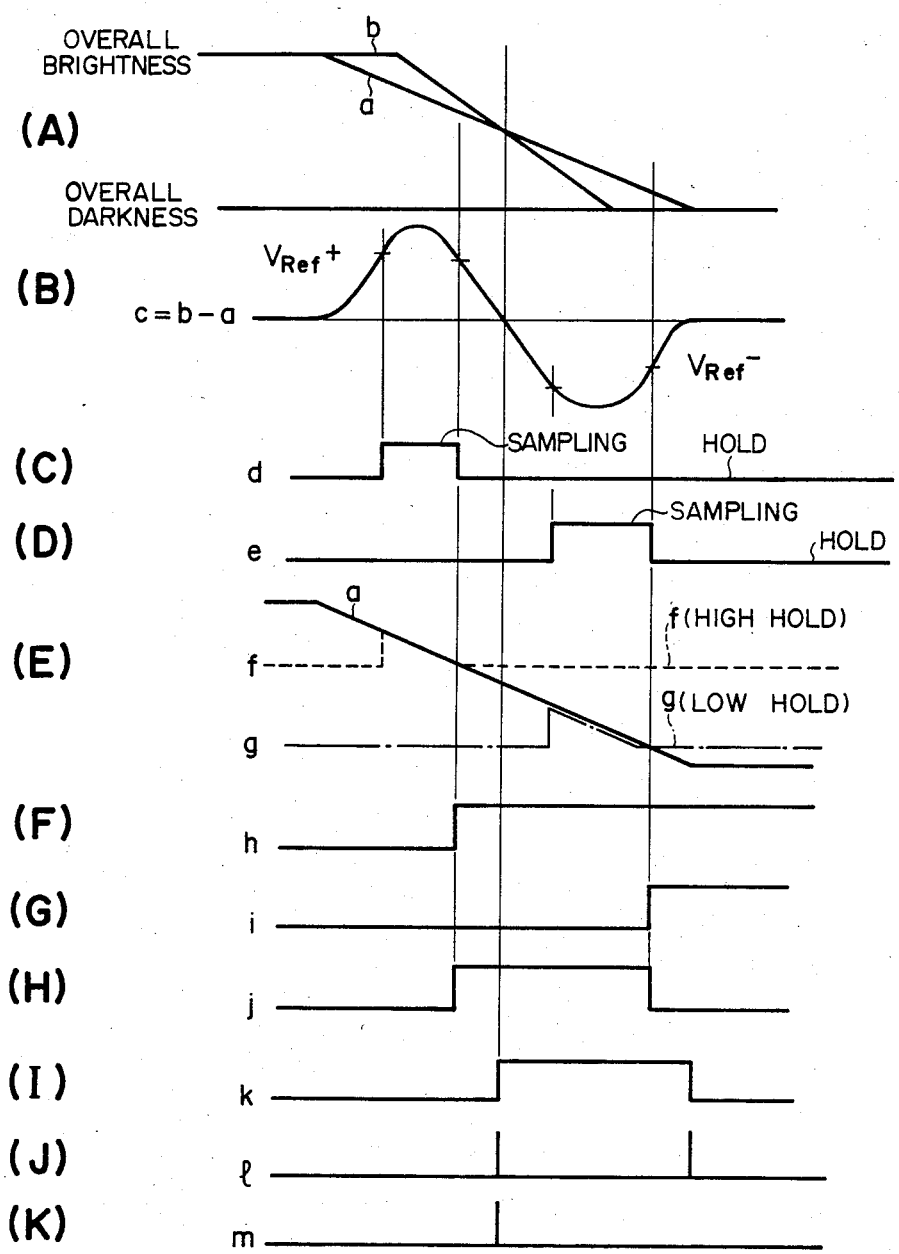

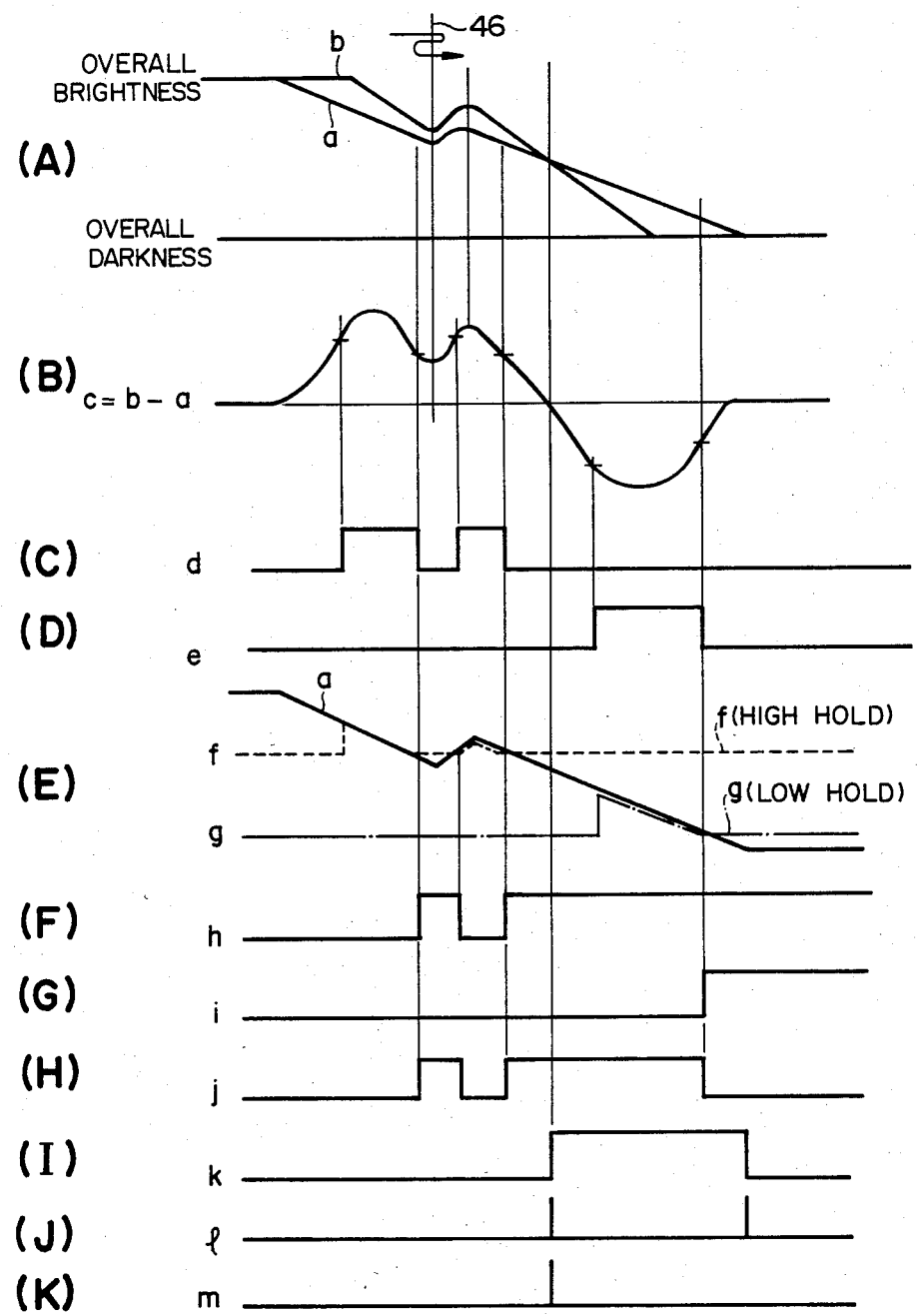

EDGE DETECTING DEVICE IN OPTICAL MEASURING INSTRUMENT

BACKGROUND OF THE INVENTION

1. Field of the Invention

This invention relates to an edge detecting device in an optical measuring instrument for measuring a dimension, a displacement value and the like of an object, and more particularly to an edge detecting device in an optical measuring instrument, wherein the object to be measured, which is not transparent, is directly irradiated by a scanning light, a transmitted light or a reflected light generated due to this irradiation, or a projected image of an object to be measured, generated due to the transmitted light or reflected light is received by a photo-electric element or elements to take out an electric signal or signals, and the measurement of a dimension, discrimination of a position, judgment of a configuration or the like of the object to be measured is performed in response to the aforesaid electric signal or signals.

2. Description of the Related Art

The optical measuring instrument of the type described, such for example as a projector, has heretofore been of such an arrangement that an object to be measured on a mount is irradiated by a parallel light, a projected image of the object to be measured is made to focus on a screen in response to a transmitted light or a reflected light thereof, and a dimension, configuration or the like of the object to be measured is measured from the formed image. However, an edge of the image of the object to be measured, projected on the screen has a so-called bleading, in general. In consequence, it is difficult that the object to be measured on the mount is moved and a measured value is accurately read in through a coincidence between the image formed on the screen and a hair line.

To obviate the above-described disadvantages, there has been proposed such a method that the edge of the formed image is moved relative to a photo-electric element, whereby a variation in value of an electric signal outputted from the photo-electric element due to a variation in a ratio between areas of a bright portion and a dark portion of the image projected on a light receiving surface of the photo-electric element is compared with a reference voltage, so that the edge of the projected image can be detected.

However, this method presents such disadvantages that the adverse influence by noises of lights of disturbance and the like is great and the measuring accuracy is lowered to a considerable extent by fluctuations in the signal obtained from the photo-electric element or in the reference voltage.

Further, there is another method, wherein the photo-electric element is moved relative to the boundary (edge) of the image projected on the screen, an output signal at this time is subjected to the second order differentiation to obtain a wave form signal, whereby this wave form signal is compared with a reference voltage to thereby detect the edge. However, there are such disadvantages that positions of the edge detected may be different depending upon the speeds of the relative movement between the photo-electric element and the projected image, and further, the measuring accuracy is lowered to a considerable extent by fluctuations in the reference voltage similarly to the above.

Further, there are provided two photo-electric elements, which are moved relative to the edge of the projected image, and a wave form signal is obtained from a plurality of output signals obtained by the aforesaid relative movement, whereby the wave form signal is compared with a reference voltage to thereby detect the edge. However, similarly to the above, there are presented such disadvantages that, due to a relative variation between the output signals and the reference voltage, fluctuations in level and the like, the measuring becomes highly unstable, further, the scope of application for the intensity of illumination of the irradiating light is narrow, the made of measuring is restricted, and a sensor section or a circuit portion becomes complicated in construction.

Particularly, in the projector, the brightness of the image projected on the screen is changed due to the fatigue of a power source lamp for irradiation, the characteristics of lenses in a projection system and lights of disturbance, the brightness of the projected image is changed due to the switching of magnifications, and further, as a condition on the part of a measurer, since the brightness suitable to the operation is varied depending on the color of pupils of the measurer (varying with races) for example, the suitable brightness should be selected. As the result, the narrow scope of application for the intensity of illumination of the irradiating light as described above leads to lowered capacity of the projector.

Furthermore, according to the conventional method of detecting the edge, when the focus of the projected image is shifted, a wave form outputted by the photo-electric element becomes gentle, thus presenting the disadvantage of incapable of accurately detecting the edge.

This disadvantage is not only of the projector but also common to the edge detections by the optical measuring instruments, wherein, in general, the transmitted light or reflected light is detected, whereby dimensions and the like of the object to be measured are directly or indirectly measured.

As against the above, as disclosed in Japanese Patent Kokai (Laid-open) No. 173408/83 (corresponding US Patent Appln. No. 481,640 now U.S. Pat. No. 4,557,602,GB 2118299A or DE 3312203AI) for exmple, there is provided an edge detecting device in an optical measuring instrument wherein a transmitted light or a reflected light is detected to directly or indirectly measure a dimension of an object to be measured, comprising:

a sensor including four light receiving elements for producing at least two sets of phase shift signals in response to a bright portion or a dark portion which is generated at the time of relative movement with the object to be measured;

first and second calculating means for calculating differences between the phase shift signals of the respective sets;

a third calculating means for calculating a difference between signals outputted form the first and the second calculating means, and a fourth calculating means for calculating a sum between the signals outputted from the first and the second calculating means; and sensing means for outputting a cross signal between a reference level signal and a signal outputted from the third calculating means, which is produced while a signal outputted from the fourth calculating means is on a predetermined level.

This edge detecting device can offer such advantages that the edge can be detected with a simplified construction and without the adverse influence due to the strength of the light irradiating the object to be measured, noises of the lights of disturbance and the like, and fluctuations in the signals outputted from the photoelectric elements or in the reference voltage during measuring, the edge can be accurately detected even when there is a shift in focus of the projected image, and further, the edge of the object to be measured can be detected by directly processing an analogue signal from a photo-electric signal.

However, the edge detecting device disclosed in Japanese Laid-Open No. 173408/83 is adapted to output a region signal while an output signal from the fourth calculating means as the means for discriminating a specific region including a point where an output signal from the sensor crosses the reference signal, i.e. the edge position of the object to be measured. However, when the output signal level of the fourth calculating means is low, there are some cases where the region signal disadvantageously cannot be generated at the actual edge position.

More specifically, when the object to be measured is formed of a material such for example as a semitransparent glass product, which cannot perfectly shut out a light, a ratio between a bright portion and a dark portion of the projected image, which are obtained by irradiating the object to be measured, becomes small, and, when the bright portion is made to be "1" and the entirely dark portion is made to be "0", the dark portion in the projected image of the semitransparent glass product remains within a scope of less than "1" and larger than "0 and the difference between the bright portion and the dark portion becomes small, whereby, there are some cases where a signal on a predetermined level or more cannot be obtained, and consequently, no region signal can be product.

Further, this edge detecting device, having a sensor including four light receiving elements arranged in a shape of , may not detect the edge of the projected image, in the case of a movement relative to an image on the screen in a projector for example, when the border line of the light receiving elements coincides with the direction of the movement. In consequence, such a disadvantage is presented that the direction of movement of the sensor relative to the projected image is restricted.

SUMMARY OF THE INVENTION

It is therefore the primary object of the present invention to provide an edge detecting device in an optical measuring instrument, wherein, even when an object to be measured is formed of a material such for example as a semitransparent glass product, which cannot perfectly shut out a light, an edge thereof can be reliably detected.

Another object of the present invention is to provide an edge detecting device in an optical measuring instrument, wherein no restriction is imposed on the direction of the movement of the sensor relative to the projected image and the edge can be reliably detected in every directions.

To this end, the present invention contemplates that, in an edge detecting device in an optical measuring instrument for detecting at least one of a transmitted and a reflected light to directly or indirectly measure a dimension of an object to be measured, the edge detecting device comprises:

a sensor including a plurality of receiving elements disposed on a plane substantially parallel to a moving plane of a relative movement between the object to be measured and the plurality of light receiving elements so as to produce phase shift signals in response to a bright or a dark portion during the relative movement, wherein levels of sensor output signals appearing at sensor output terminals in response to outputs of the light receiving elements become equal in value to each other each time the bright or dark portion is generated during the relative movement;

a difference calculator connected to the sensor output terminals in the sensor, for calculating a difference between the phase shift signals;

a region signal generator for comparing a differential output signal of the difference calculator with reference signals of high level and low level, producing hold singals when the differential output signal is present between the high level and the low level, holding one sensor signal out of the sensor output signals, and outputting a signal in a specific region including a cross point between a reference level signal and the phase shift signals when the output signal is present between the high hold signal and the low hold signal thus held; and sensing means for outputting a cross signal between the differential output signal from the difference calculator and a preset reference level signal while the region signal generator outputs the signal.

To the above end, the present invention contemplates that the region signal generator comprises:

a first comparator for comparing the differential output signal of the difference calculator with the high level reference signal and outputting a hold signal when the differential output signal is lower than the high level;

a second comparator for comparing the differential output signal with the low level reference signal and outputting a hold signal when the differential signal is higher than the low level;

a first and a second sample hold circuits for holding one sensor output signal of the sensor is response to the hold signals inputted from the first and the second comparators and sampling the sensor output signal when the hold signals are inputted;

a third comparator for comparing output signal from the first sample hold circuit with the sensor output and outputting a signal when the output signal is lower than the sensor output signal;

a fourth comparator for comparing the output singal from the second sample hold circuit with the sensor output signal and outputting a signal when the output signal is higher than the sensor output signal; and an exclusive OR gate for outputting the region signal when only one of the third and the fourth comparators outputs said signal.

To the above end, the present invention contemplates that the sensing means comprises:

a comparator for outputting a signal when the output signal from the difference calculator and the reference level signal are compared and the both signals coincide with each other;

a pulse signal generator for producing an edge pulse signal in response to the signal outputted from the comparator; and an AND gate for outputting an edge detecting signal only when signals are outputted from both the pulse signal generator and the region signal generator.

To the above end, the present invention contemplates that said AND gate outputs the edge detection signal to a counter of a displacement detecting device interlocked with a mount for the object to be measured, the displacement detecting device is constituted by an encoder interlocked with the mount, for generating pulse signals as commensurate to the movement value of the mount and the counter for reading pulse signals outputted from the encoder, and the counter is adapted to output the value thus read to a memory when the edge detection signal is inputted thereto from the AND gate.

To the above end, the present invention contemplates that the sensor comprises two light receiving elements which are equal in light receiving area to each other and arranged concentrically with each other.

To the above end, the present invention contemplates that the sensor includes a pre-amplifier disposed between one of said plurality of light receiving elements and one of said sensor output terminals, opposed thereto, whereby output signal levels of said plurality of light receiving elements against received light quantities being equal to one another are made equal to one another at said sensor output terminals opposed thereto.

According to the present invention, a differential signal of output signals from a plurality of light receiving elements is compared with a reference signal to thereby output a region signal, so that, even when a difference between the outputs from the light receiving elements at a bright portion and a dark portion is small, the edge can be reliably detected.

Furthermore, even when fluctuations are caused to the differential signal due to the electric, optical or mechanical noises, a region signal is generated to thereby detect the edge reliably.

Further, according to the present invention, a pair of light receiving elements constituting a sensor are arranged concentrically with each other, whereby the border line of the light receiving elements and the moving direction thereof do not coincide with each other, so that the edge can be reliably detected irrespective of the direction of movement of the sensor relative to the object to be measured.

BRIEF DESCRIPTION OF THE DRAWINGS

FIG. 3 is a chart showing the process of the signal processing in the above embodiment; and FIG. 4 is a chart showing the process of the signal processing at the time of sensor output fluctuations in the above embodiment.

DETAILED DESCRIPTION OF THE PREFERRED EMBODIMENT

Figure 1:
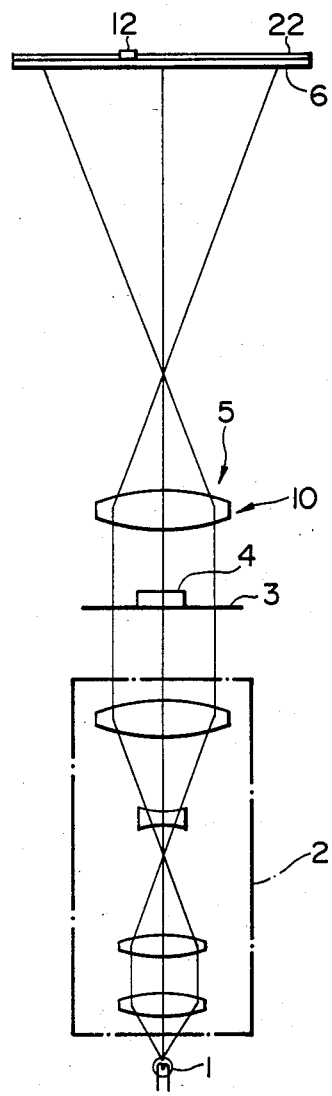
FIG. 1 is an optical system chart showing an embodiment when the edge detecting device in an optical measuring instrument according to the present invention is applied to a projector.
Figure 2:
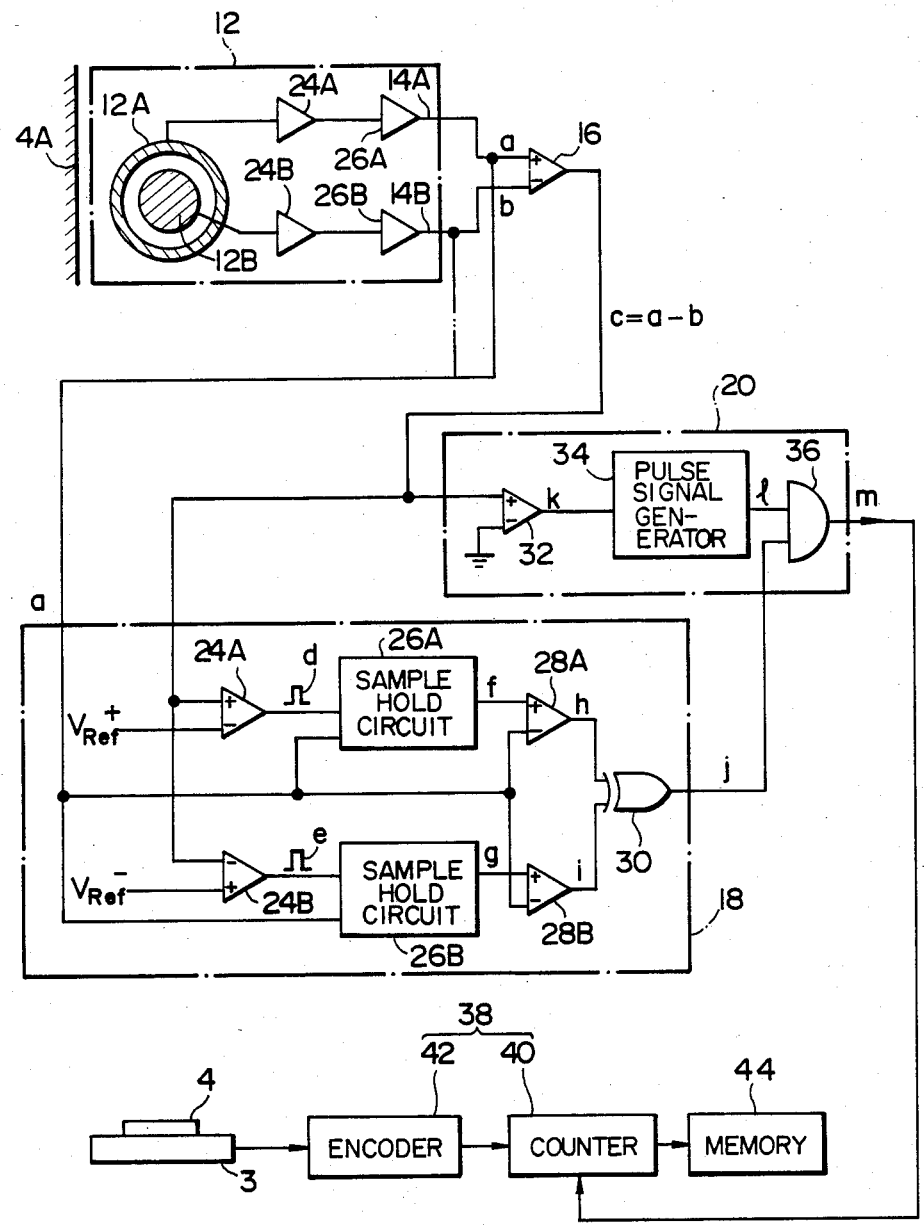
FIG. 2 is a block diagram showing the arrangement of the above embodiment.

Description will hereunder be given of embodiments of the present invention with reference to the drawings.

In this embodiment, the present invention is applied to a projector. As shown in FIGS. 1 to 4, according to this embodiment, in an edge detecting device in a projector 10, wherein a light from a light source lamp 1 irradiates an object 4 to be measured from below a mount 3 through condenser lenses 2 or from above the mount 3 through another light path, whereby a projected image of the object 4 to be measured is made to focus on a screen 6 through a projector lens 5 in response to the transmitted light or the reflected light, so that a dimension or the like of the object 4 to be measured can be indirectly measured, the device comprises;

a sensor 12 including two light receiving elements 12A and 12B disposed concentrically with each other on a plane substantially parallel to a moving plane of a relative movement between the object 4 to be measured and the two light receiving elements 12A, 12B so as to produce phase shift signals in response to a bright or a dark portion during the relative movement, wherein levels of sensor output signals appearing at sensor output terminals 14A and 14B in response to outputs of the light receiving elements 12A and 12B become equal in value to each other each time the bright or dark portion is generated during the relative mevement;

a difference calculator 16 connected to the sensor output terminals 14A and 14B in the sonsor 12, for calculating a difference between the phase shift signals;

a region signal generator 18 for comparing a differential output signal of the difference calculator 16 with reference signals of high level and low level, producing hold signals when the differential output signal is present between the high level and the low level, holding one sensor signal out of the sensor output signals, and outputting a signal in a specific region including a cross point between a reference level signal and the phase shift signals when the output signal is present between the high hold signal and the low hold signal thus held; and sensing means 20 for outputting a cross signal between a differential output signal from the difference calculator 16 and a preset reference level signal while the region signal generator 18 outputs the signal.

As shown in FIG. 1, the sensor 12 is integrally provided with a transparent plate 22 mounted slidably on and in parrallel to the top surface of the screen 6 of the projector 10 and made movable with the transparent plate 22.

The light receiving element 12B partially constituting the sensor 12 is formed into a circular shape in cross section, to provide a ring concentric with the light receiving element 12A, disposed therearound and radially spaced apart therefrom.

Here, in addition to the light receiving elemnts 12A and 12B, the sensor 12 is provided with current-voltage transducers 24A and 24B for current-voltage-transducing outputs from the light receiving elements 12A and 12B and also provided with amplifiers 26A and 26B for amplifying these output voltages.

These amplifiers 26A and 26B are offset-controlled to cancel the dark voltage of the light receiving elements 12A and 12B at the overall darkness and gain-controlled at the overall brightness such that outputs at the sensor output terminals 14A and 14B are on the same level.

The region signal generator 18 comprises;

a first comparator 24A for comparing the differential output signal of the difference calculator 16 with the high level reference signal and outputting a hold signal when the differential output signal is lower than the high level;

a second comparator 24B for comparing the differential output signal with the low level reference signal and outputting a hold signal when the differential signal is higher than the low level;

a first and a second sample hold circuits 26A and 26B for holding one sensor output signal a of said sensor 12 in response to the hold signals inputted from the first and the second comparators 24A and 24B and sampling the sensor output signal a when the hold signals are inputted;

a third comparator 28A for comparing output signal from the first sample hold circuit 26A with the sensor output signal a and outputting a signal when the output signal is lower than the sensor output signal a;

a fourth comparator 28B for comparing said output signal from said second sample hold circuit 26B with said sensor output signal a and outputting a signal when the output signal is higher than the sensor output signal a; and an exclusive OR gate 30 for outputting the region signal when only one of the third and the fourth comparators 28A and 28B outputs said signal.

Furthermore, the sensing means 20 comprises:

a comparator 32 for outputting a signal when the output signal from the difference calculator 16 and the reference level signal are compared and the both signals coincide with each other, i.e. at the cross point;

a pulse signal generator 34 for producing an edge pulse signal in response to the signal outputted from the comparator 32; and an AND gate 36 for outputting an edge detecting signal only when signals are outputted from both the pulse signal generator 34 and the region signal generator 18. This AND gate 36 outputs the edge detection signal to a counter 40 of a displacement detecting device 38 interlocked with the mount 3.

This displacement detecting device 38 is constituted by an encoder 42 interlocked with the mount 3, for generating pulse signals as commensurate to the movement value of the mount 3 and the counter 40 for reading pulse signals outputted from this encoder 42.

This counter 40 is adapted to output the value thus read to a memory 44 when the edge detection signal is inputted thereto from the AND gate 36.

Description will hereunder be given of action of the above embodiment.

A projected image 4A of the object 4 to be measured, which is made to focus on the screen 6, is moved in one direction relative to the sensor 12, whereby the edge of the projected image 4A is made to cross the sensor 12.

When the projected image 4A relatively approaches the sensor 12 and crosses it, output signals obtained by the light receiving elements 12A and 12B, passed through the current-voltage transducers 24A and 24B, regulated by the amplifiers 26A and 26B and produced from the sensor output terminals 14A and 14B become phase shift signals being equal in amplitude to each other as indicated by reference characters a and b in FIG. 3(A). As shown in FIG. 3(B), these output signals are calculated into c = b − a and outputted by the difference calculator 16.

The output signal a from the sensor output terminal 14A is inputted to the first and the second comparators 24A and 24B of the region signal generator 18, respectively.

As shown in FIG. 3(C), the first comparator 24A outputs a sampling singal d to the first sample hold circuit 26A when the reference voltage Vref+ and the input signal c are compared with each other and the signal c is lower in value than the reference voltage Vref+. Furthermore, as shown in FIG. 3(D), the second comparator 24B outputs a sampling signal e to the second sample hold circuit 26B when the inputted signal c and a reference voltage Vref− are compared with each other and the signal c is lower in value than the reference voltage Vref−. Additionally, the first and the second comparators 24A and 24B are provided with hysteresis characteristics so as to prevent the chattering as shown in FIGS. 3(C) and 3(D).

When the sampling signal d is outputted from the first comparator 24A and the sampling signal e is outputted from the second comparator 24B, the first and the second sample hold circuits 26A and 26B are adapted to perform sampling of the sensor output signal a, and, when these sampling signals d and e are not outputted, the values of signals at the final time points of the sampling and held, respectively.

In consequence, as indicated by broken lines and a one-dot chain line in FIG. 3(E), these sample hold circuits 26A and 26B are adapted to output a high hold signal f and a low hold signal g to the third comparator 28A and the fourth comparator 28E.

As shown in FIGS. 3(F) and 3(G), the third comparator 28A and the fourth comparator 28B output signals h and i to the exclusive OR gate 30 when the high hold signal f and the low hold signal g, which are inputted, are compared with each other and the high hold signal f and the low hold signal g are larger in value than the sensor output signal a.

When only one of the third comparator 28A and the fourth comparator 28B outputs a signal, this exclusive OR gate 30 outputs a digital signal j of "1" as shown in FIG. 3(H).

On the other hand, a differential output signal c outputted from the difference calculator 16 is inputted to the comparator 32 of the sensing means 20, and, as shown in FIG. 3(I), this comparator 32 outputs a digital signal k of "1" when the differential output signal c crosses a reference level signal of "0"1 .

In response to an output from the comparator 32, the pulse signal generator 34 outputs pulse signals 1 as shown in Fig. 3(J) to the AND gate 36.

The pulse signals 1 from the pulse signal generator 34 and the digital signal j from the exclusive OR gate 30 are inputted to the AND gate 36, and, when both the inputted signals are of "1"1 , this AND gate 36 outputs pulse signals m of $10\mu$ Sec for example as shown in FIG. 3(K), and detects the edge of the projected image 4A at this time point.

The foregoing description is of the case where the normal measurement has been achieved. However, depending upon the measuring environment, fluctuations may be temporarily caused to the differential output singal c due to the optical, electrical noises, vibrations of the mount 3 or the like.

In this case, in the conventional edge detecting device, the region signal cannot be produced, or a region singal is outputted at a cross point between the differential output signal and the reference signal, i.e. at a time point where the edge does not appear, so that it may become impossible to detect the edge.

In the above embodiment, as shown in FIG. 4 for example, when the sensor output signals a and b are vibrated once as centered about a vibration center line 46 due to the vibrations of the mount 3, these sensor output singals a and b become ones as shown in FIG. 4(A).

In the case of the conventional edge detecting device, no considerations are given to the vibrations and fluctuations of the signals to be sensed, such as the differential output signals themselves, whereby, when these sensor output signals a and b are lowered at the position of the vibration center line 46, there are many cases where a signal tends to be produced erroneously. In the case of this embodiment, as shown in Fig. 4(E), the high hold signal f is fluctuated due to the vibrations of the sensor 12, in accordance therewith the output signal h is outputted from the third comparator 28A and the digital signal j is outputted from the exclusive OR gate 30. However, this region signal j itself from the exclusive OR gate is not shifted by the aforesaid vibrations. In other words, even if the vibrations of the differential signal and the like occur, the region signal j is not affected thereby, so that the region including the cross point can be reliably specified.

In consequence, the region signal j is outputted at the time point where the region signal j is overlapped with pulse signals 1 outputted in response to the output signal k from the comparator 30, so that the edge signal m is outputted from the AND gate 36.

The edge signal m is inputted to the counter 40 of the displacement detecting device 38, and the counter 40 outputs the value read at the time point where this edge signal m is inputted to the memory 44, so that the edge position of the object 4 to be measured, which is disposed on the mount 3, is detected The signals stored in the memory 44 are outputted to another calculating unit, printed out or indicated on a display.

Here, in the above embodiment, when the object 4 to be measured is formed of a material such for example as a semitransparent glass product, which cannot shut out the light perfectly, as shown in FIGS. 3(A) and 4(A), respectively, when the sensor output signals are set to "1" in the case of the brightness and "0" in the case of the overall darkness, the sensor output signals a and b in the dark portion each have a value larger than 0 and approaching 1.

In this case, when these sensor output signals a and b themselves are compared with the reference voltage Vref—, a cross point with the reference signal Vref— cannot be obtained, whereby, there are some cases where the region signal cannot be obtained.

In this embodiment, since the region signal is formed in response to a differential output signal, i.e. c =a −b of the difference calculator 16, even if the object 4 to be measured is formed of the semitransparent material, the region signal can be reliably obtained.

Furthermore, in this embodiment, since the light receiving elements 12A and 12B, which constitute the sensor 12, are arranged in the concentric shape and the levels of the signals at the sensor output terminals 14A and 14B, which are produced by these light receiving elements, are equal to each other, the border line and the moving direction of the light receiving elements 14A and 14B do not coincide with each other, and, irrespective of the moving direction of the sensor 12 relative to the projected image 4A, signals hvaing outputs equal to each other can be obtained. In consequence, no restriction is imposed on the moving direction of the sensor relative to the object to be measured, so that the edge can be detected with high accuracy.

Furthermore, the light receiving elements 12A and 12B, which constitute the sensor 12, are arranged in the concentric shape, whereby the area opposed to the object to be measured of the light receiving surface of the light receiving elements 12A and 12B can be decreased, so that the invention can be applied to a measuring instrument being compact in size, moreover, a supporting means can be simplified in construction and an effective inspecting scope of screen can be increased in a projector.

Furthermore, the sensor 12 is compact size, so that the invention can be applied to the edge detection for an object to be measured, which has a complicated configuration.

Additionally, in the above embodiment, the light receiving element 12B has been formed into the circle and the light receiving element 12A has been formed into the concentric ring surrounding the periphery of the circular light receiving element 12B with radially spaced apart therefrom, however, the present invention need not necessarily be limited to this, and such light receiving elements may be used as being plural in number and phase shift signals can be obtained thereby.

In consequence, for example, a ring-shaped light receiving element may be arranged with a circular light receiving element disposed inside, with no radial space being provided therebetween, and the light receiving elements may be formed of concentric ring-shaped light receiving elements.

Further, for example, four light receiving elements may be provided in a block shape.

Furthermore, in the above embodiment, the light receiving elements 12A and 12B have been made equal in light receiving area to each other, whereby the levels of the output signals appearing at the sensor output terminals 14A and 14B have been equal in value to each other, however, any arrangement may be adopted only if the levels of the output signals appearing at the sensor output terminals 14A and 14B are equal in value to each other. In consequence, the output levels appearing at the both sensor output terminals 14A and 14B may be made equal in value to each other without interposing the amplifiers between the light receiving elements 12A, 12B and the sensor output terminals 14A, 14B, or without providing the amplifiers.

Further, in the above embodiment, the mount 3 is moved, whereby the projected image 4A is moved relative to the sensor 7, however, the sensor 7 may be moved relative to the projected image 4A.

Furthermore, in the above embodiment, the edge of the image projected on the screen has been measured in the projector, however, the present invention need not necessarily be limited to this, and, in general, is applicable to the edge detecting devices in the optical measuring instruments, wherein the transmitted or reflected light is detected to directly or indirectly measure a dimension of the object to be measured.

In consequence, the present invention is applicable to a photo-electric length measuring instrument wherein a main scale and an index scale, which are provided with optical lattices, respectively, are moved relative to each other so as to hotoelectrically measure a dimension and the like or an edge detecting device in a measuring instrument, wherein an object to be measured is parallelly scanned by a laser beam or the like so as to measure a dimension and the like of the object to be measured from a bright or a dark portion thereof.

What is claimed is:

1. An edge detecting device in an optical measuring instrument for detecting at least of one of a transmission and a reflected light to directly or indirectly measure a dimension of an object to be measured, said detecting device comprises:

a sensor including a plurality of light receiving elements disposed on a plane substantially parallel to a moving plane of a relative movement between said object to be measured and said plurality of light receiving elements so as to produce phase shift signals in response to a bright or a dark portion during said relative movement, wherein levels of sensor output signals appearing at sensor output terminals in response to outputs of said light receiving elements become equal in value to each other each time the bright or dark portion is generated during said relative movement;

a difference calculator connected to said sensor output terminals in said sensor, for calculating a difference between said phase shift signals;

a region signal generator for comparing a differential output signal of said difference calculator with reference signals of high level and low level, producing hold signals when said differential output signal is present between the high level and the low level, holding one sensor signal out of said sensor output signals, and outputting a signal in a specific region including a cross point between a reference level signal and said phase shift signals when said output signal is present between the high hold signal and the low hold signal thus held; and sensing means for outputting a cross signal between the differential output signal from said difference calculator and a preset reference level signal while said region signal generator outputs said signal.

2. An edge detecting device in an optical measuring instrument as set forth in claim 1, wherein said region signal generator comprises:

a first comparator for comparing the differential output signal of said difference calculator with the high level reference signal and outputting a hold signal when the differential output signal is lower than the high level;

a second comparator for comparing the differential output signal with the low level reference signal and outputting a hold signal when the differential signal is higher than the low level;

a first and a second sample hold circuit for holding one sensor output signal of said sensor in response to said hold signals inputted from said first and said second comparators and sampling said sensor output signal when said hold signals are inputted;

a third comparator for comparing said output signal from said first sample hold circuit with said sensor output signal and outputting a signal when said output signal is lower than said sensor output signal;

a fourth comparator for comparing said output signal from said second sample hold circuit with said sensor output signal and outputting a signal when said output signal is higher than said sensor output signal; and an exclusive OR gate for outputting the region signal when only one of said third and said fourth comparators outputs said signal.

3. An edge detecting device in an optical measuring instrument as set forth in claim 1, wherein the sensing means comprises:

a comparator for outputting a signal when the output signal from the difference calculator and the reference level signal are compared and the both signals coincide with each other;

a pulse signal generator for producing an edge pulse signal in response to the signal outputted from the comparator; and an AND gate for outputting an edge detecting signal only when signals are outputted from both the pulse signal generator and the region signal generator.

4. An edge detecting device in an optical measuring instrument as set forth in claim 2, wherein the sensing means comprises:

a comparator for outputting a signal when the output signal from the difference calculator and the reference level signal are compared and the both signals coincide with each other;

a pulse signal generator for producing an edge pulse signal in response to the signal outputted from the comparator; and an AND gate for outputting an edge detecting signal only when signals are outputted from both the pulse signal generator and the region signal generator.

5. An edge detecting device in an optical measuring instrument as set forth in claim 3, wherein said AND gate outputs the edge detection signal to a counter of a displacement detecting device interlocked with a mount for the object to be measured, the displacement detecting device is constituted by an encoder interlocked with the mount, for generating pulse signals as commensurate to the movement value of the mount and the counter for reading pulse signals outputted from the encoder, and the counter is adapted to output the value thus read to a memory when the edge detection signal is inputted thereto from the AND gate.

6. An edge detecting device in an optical measuring instrument as set forth in claim 4, wherein said AND gate outputs the edge detection signal to a counter of a displacement detecting device interlocked with a mount for the object to be measured, the displacement detecting device is constituted by an encoder interlocked with the mount, for generating pulse signals as commensurate to the movement value of the mount and the counter for reading pulse signals outputted from the encoder, and the counter is adapted to output the value thus read to a memory when the edge detection signal is inputted thereto from the AND gate.

7. An edge detecting device in an optical measuring instrument as set forth in claim 1, wherein said sensor comprises two light receiving elements which are equal in light receiving area to each other and arranged concentrically with each other.

8. An edge detecting device in an optical measuring instrument as set forth in claim 2, wherein said sensor comprises two light receiving elements which are equal in light receiving area to each other and arranged concentrically with each other.

9. An edge detecting device in an optical measuring instrument as set forth in claim 3, wherein said sensor comprises two light receiving elements which are equal in light receiving area to each other and arranged concentrically with each other.

10. An edge detecting device in an optical measuring instrument as set forth in claim 4, wherein said sensor comprises two light receiving elements which are equal in light receiving area to each other and arranged concentrically with each other.

11. An edge detecting device in an optical measuring instrument as set forth in claim 5, wherein said sensor comprises two light receiving elements which are equal in light receiving area to each other and arranged concentrically with each other.

12. An edge detecting device in an optical measuring instrument as set forth in claim 6, wherein said sensor comprises two light receiving elements which are equal in light receiving area to each other and arranged concentrically with each other.

13. An edge detecting device in an optical measuring instrument as set forth in claim 1, wherein said sensor includes a pre-amplifier disposed between one of said plurality of light receiving elements and one of said sensor output terminals, opposed thereto, whereby output signal levels of said plurality of light receiving elements against received light quantities being equal to one another are made equal to one another at said sensor output terminals opposed thereto.

14. An edge detecting device in an optical measuring instrument as set forth in claim 2, wherein said sensor includes a pre-amplifier disposed between one of said plurality of light receiving elements and one of said sensor output terminals, opposed thereto, whereby output signal levels of said plurality of light receiving elements against received light quantities being equal to one another are made equal to one another at said sensor output terminals opposed thereto.

15. An edge detecting device in an optical measuring instrument as set forth in claim 3, wherein said sensor includes a pre-amplifier disposed between one of said plurality of light receiving elements and one of said sensor output terminals, opposed thereto, whereby output signal levels of said plurality of light receiving elements against received light quantities being equal to one another are made equal to one another at said sensor output terminals opposed thereto.

16. An edge detecting device in an optical measuring instrument as set forth in claim 4, wherein said sensor includes a pre-amplifier disposed between one of said plurality of light receiving elements and one of said sensor output terminals, opposed thereto, whereby output signal levels of said plurality of light receiving elements against received light quantities being equal to one another are made equal to one another at said sensor output terminals opposed thereto.

17. An edge detecting device in an optical measuring instrument as set forth in claim 5, wherein said sensor includes a pre-amplifier disposed between one of said plurality of light receiving elements and one of said sensor output terminals, opposed thereto, whereby output signal levels of said plurality of light receiving elements against received light quantities being equal to one another are made equal to one another at said sensor output terminals opposed thereto.

18. An edge detecting device in an optical measuring instrument as set forth in claim 6, wherein said sensor includes a pre-amplifier disposed between one of said plurality of light receiving elements and one of said sensor output terminals, opposed thereto, whereby output signal levels of said plurality of light receiving elements against received light quantities being equal to one another are made equal to one another at said sensor output terminals opposed thereto.

19. An edge detecting device in an optical measuring instrument as set forth in claim 7, wherein said sensor includes a pre-amplifier disposed between one of said plurality of light receiving elements and one of said sensor output terminals, opposed thereto, whereby output signal levels of said plurality of light receiving elements against received light quantities being equal to one another are made equal to one another at said sensor output terminals opposed thereto.

20. An edge detecting device in an optical measuring instrument as set forth in claim 8, wherein said sensor includes a pre-amplifier disposed between one of said plurality of light receiving elements and one of said sensor output terminals, opposed thereto, whereby output signal levels of said plurality of light receiving elements against received light quantities being equal to one another are made equal to one another at said sensor output terminals opposed thereto.

21. An edge detecting device in an optical measuring instrument as set forth in claim 9, wherein said sensor includes a pre-amplifier disposed between one of said plurality of light receiving elements and one of said sensor output terminals, opposed thereto, whereby output signal levels of said plurality of light receiving elements against received light quantities being equal to one another are made equal to one another at said sensor output terminals opposed thereto.

22. An edge detecting device in an optical measuring instrument as set forth in claim 10, wherein said sensor includes a pre-amplifier disposed between one of said plurality of light receiving elements and one of said sensor output terminals, opposed thereto, whereby output signal levels of said plurality of light receiving elements against received light quantities being equal to one another are made equal to one another at said sensor output terminals opposed thereto.

23. An edge detecting device in an optical measuring instrument as set forth in claim 11, wherein said sensor includes a pre-amplifier disposed between one of said plurality of light receiving elements and one of said sensor output terminals, opposed thereto, whereby output signal levels of said plurality of light receiving elements against received light quantities being equal to one another are made equal to one another at said sensor output terminals opposed thereto.

24. An edge detecting device in an optical measuring instrument as set forth in claim 12, wherein said sensor includes a pre-amplifier disposed between one of said plurality of light receiving elements and one of said sensor output terminals, opposed thereto, whereby output signal levels of said plurality of light receiving elements against received light quantities being equal to one another are made equal to one another at said sensor output terminals opposed thereto.

* * * * *